United States Patent
Chae et al.

(10) Patent No.: US 10,367,561 B2
(45) Date of Patent: Jul. 30, 2019

(54) METHOD AND APPARATUS FOR GENERATING SIGNAL BY DEVICE-TO-DEVICE COMMUNICATION TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Youngtae Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 74 days.

(21) Appl. No.: 15/543,528

(22) PCT Filed: Jan. 25, 2016

(86) PCT No.: PCT/KR2016/000778
§ 371 (c)(1),
(2) Date: Jul. 13, 2017

(87) PCT Pub. No.: WO2016/117982
PCT Pub. Date: Jul. 28, 2016

(65) Prior Publication Data
US 2017/0373738 A1    Dec. 28, 2017

Related U.S. Application Data

(60) Provisional application No. 62/106,739, filed on Jan. 23, 2015.

(51) Int. Cl.
*H04B 7/06* (2006.01)
*H04L 5/00* (2006.01)
(Continued)

(52) U.S. Cl.
CPC ........ *H04B 7/0617* (2013.01); *H04B 7/0626* (2013.01); *H04L 5/00* (2013.01);
(Continued)

(58) Field of Classification Search
CPC ..... H04W 88/14; H04W 88/12; H04W 92/02; H04W 76/02; H04W 88/181;
(Continued)

(56) References Cited

U.S. PATENT DOCUMENTS 9,999,073 B2 * 6/2018 Nammi ............... H04W 74/006
2009/0003478 A1   1/2009 Kim et al.
(Continued)

FOREIGN PATENT DOCUMENTS

AU    2012203459 A1    7/2012
EP       2159950 A1    3/2010
(Continued)

*Primary Examiner* — Sharad Rampuria
(74) *Attorney, Agent, or Firm* — Dentons US LLP

(57) ABSTRACT

An embodiment of the present invention provides a method for generating a device-to-device (D2D) signal by a terminal in a wireless communication system, the method for generating a D2D signal comprising: a step of mapping, onto one or more resource block (RB) groups, each of one or more modulation symbol groups generated from one or more transmission blocks; and a step for applying different beam vectors to each of the one or more RB groups, wherein the number of beam vectors is determined according to a channel state.

11 Claims, 15 Drawing Sheets

(51) Int. Cl.
*H04L 27/26* (2006.01)
*H04W 72/04* (2009.01)

(52) U.S. Cl.
CPC .......... *H04L 27/26* (2013.01); *H04L 27/2614* (2013.01); *H04L 27/2636* (2013.01); *H04W 72/04* (2013.01)

(58) Field of Classification Search
CPC ... H04W 88/085; H04W 88/08; H04W 16/28; H04W 16/24; H01Q 1/246; H04B 7/0617; H04B 7/0408
See application file for complete search history.

(56) References Cited

U.S. PATENT DOCUMENTS

| | | |
|---|---|---|
| 2013/0229307 A1 | 9/2013 | Chang et al. |
| 2013/0250924 A1 | 9/2013 | Chen et al. |
| 2013/0329685 A1* | 12/2013 | Fujimoto ............... H04W 48/12 370/329 |
| 2014/0226744 A1 | 8/2014 | Tong et al. |
| 2016/0143055 A1* | 5/2016 | Nammi ............... H04W 74/006 370/329 |
| 2017/0331577 A1* | 11/2017 | Parkvall ............... H04J 11/0079 |

FOREIGN PATENT DOCUMENTS

| | | |
|---|---|---|
| WO | 2008/021396 A2 | 2/2008 |
| WO | 2013157790 A1 | 10/2013 |

* cited by examiner (a)

(b)

(a)

(b)

(a)

(b)

(a)

(b)

METHOD AND APPARATUS FOR GENERATING SIGNAL BY DEVICE-TO-DEVICE COMMUNICATION TERMINAL IN WIRELESS COMMUNICATION SYSTEM

This application is a National Stage Application of International Application No. PCT/KR2016/000778, filed on Jan. 25, 2016, which claims the benefit of U.S. Provisional Application No. 62/106,739, filed on Jan. 23, 2015, all of which are hereby incorporated by reference in their entirety for all purposes as if fully set forth herein.

TECHNICAL FIELD

Following description relates to a wireless communication system, and more particularly, to a method of generating a signal using an SC-FDM scheme in a D2D communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

A technical task of the present invention is to provide a method of generating a signal while PARR (peak-to-average power ratio) is suppressed as much as possible and a method of transmitting the signal to maximize diversity.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of generating a D2D (device-to-device) signal, which is generated by a user equipment in a wireless communication system, includes the steps of mapping each of one or more modulation symbol groups generated from one or more transport blocks to one or more RB (resource block) groups, and applying a different beam vector to each of the one or more RB groups. In this case, the number of beam vectors can be determined according to a channel state.

To further achieve these and other advantages and in accordance with the purpose of the present invention, according to a different embodiment, a D2D (device-to-device) user equipment in a wireless communication system includes a transmitter and a receiver, and a processor, the processor configured to map each of one or more modulation symbol groups generated from one or more transport blocks to one or more RB (resource block) groups, the processor configured to apply a different beam vector to each of the one or more RB groups, In this case, the number of beam vectors can be determined according to a channel state.

The number of beam vectors may increase as a channel property is getting close to a flat.

Each of the one or more RB groups may consist of RBs contiguous on a frequency axis.

Each of the one or more RB groups may correspond to a set of resources having a different comb index.

A comb index may correspond to an offset used for mapping each modulation symbol included in the one or more modulation symbol groups to a frequency axis resource on the whole frequency band.

The modulation symbol group can be generated by grouping modulation symbols which are generated by performing channel coding on one transport block.

The modulation symbol group can be generated by repeatedly performing channel coding on one transport block.

The modulation symbol group can be generated by performing channel coding on each redundancy version of one transport block.

The modulation symbol group can be generated by performing channel coding on each of two or more transport blocks.

The beam vector can mandatorily include an element corresponding to 0.

The number of beam vectors can be transmitted via SA (scheduling assignment).

The beam vector can be indicated by a beam set index.

A beam set can be determined in advance.

The beam set may include a plurality of beam vectors orthogonal to each other.

Advantageous Effects

According to the present invention, when an SC-FDM signal is generated and transmitted, it is able to minimize PARR and maximize a diversity gain.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
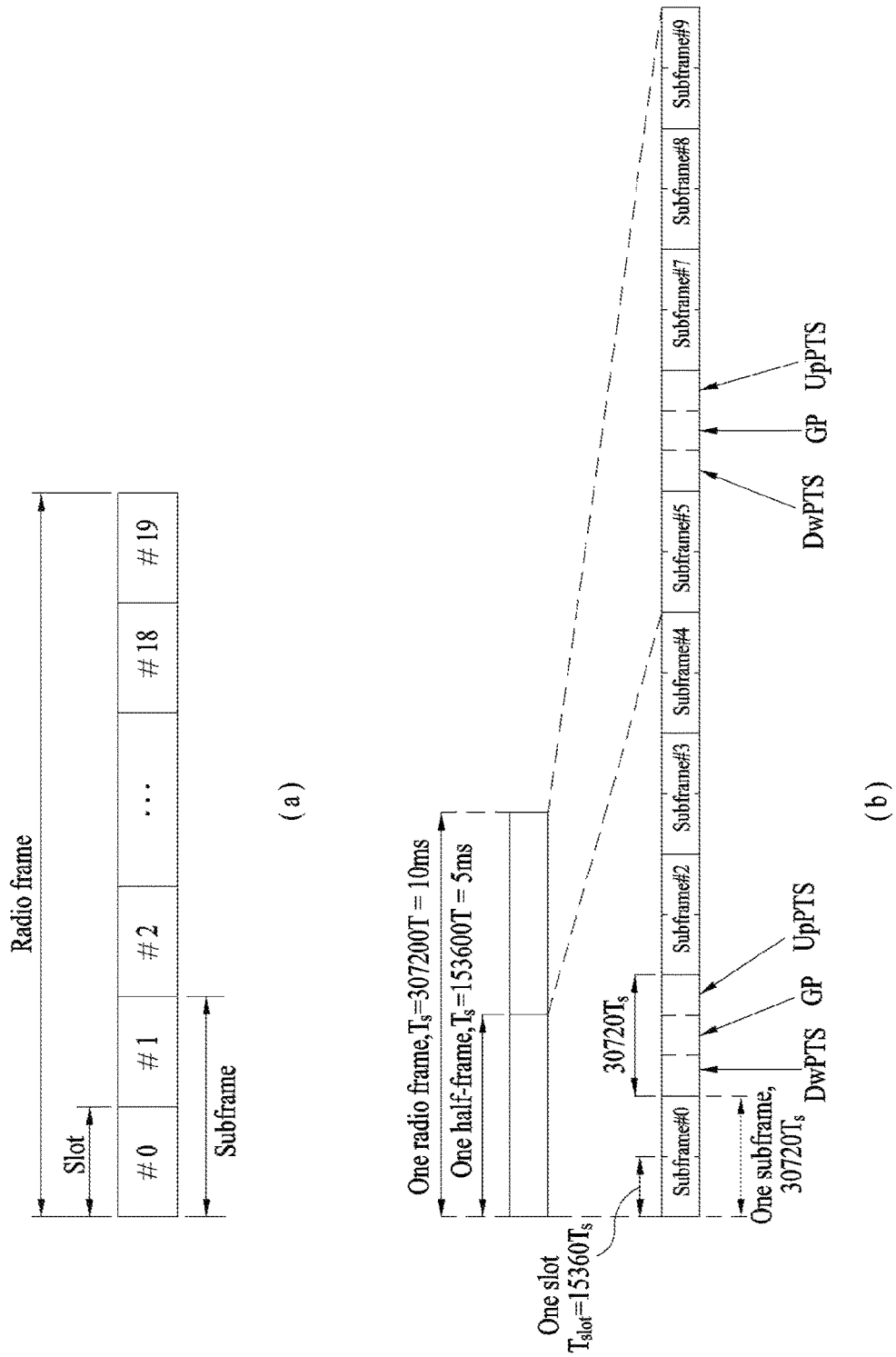
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
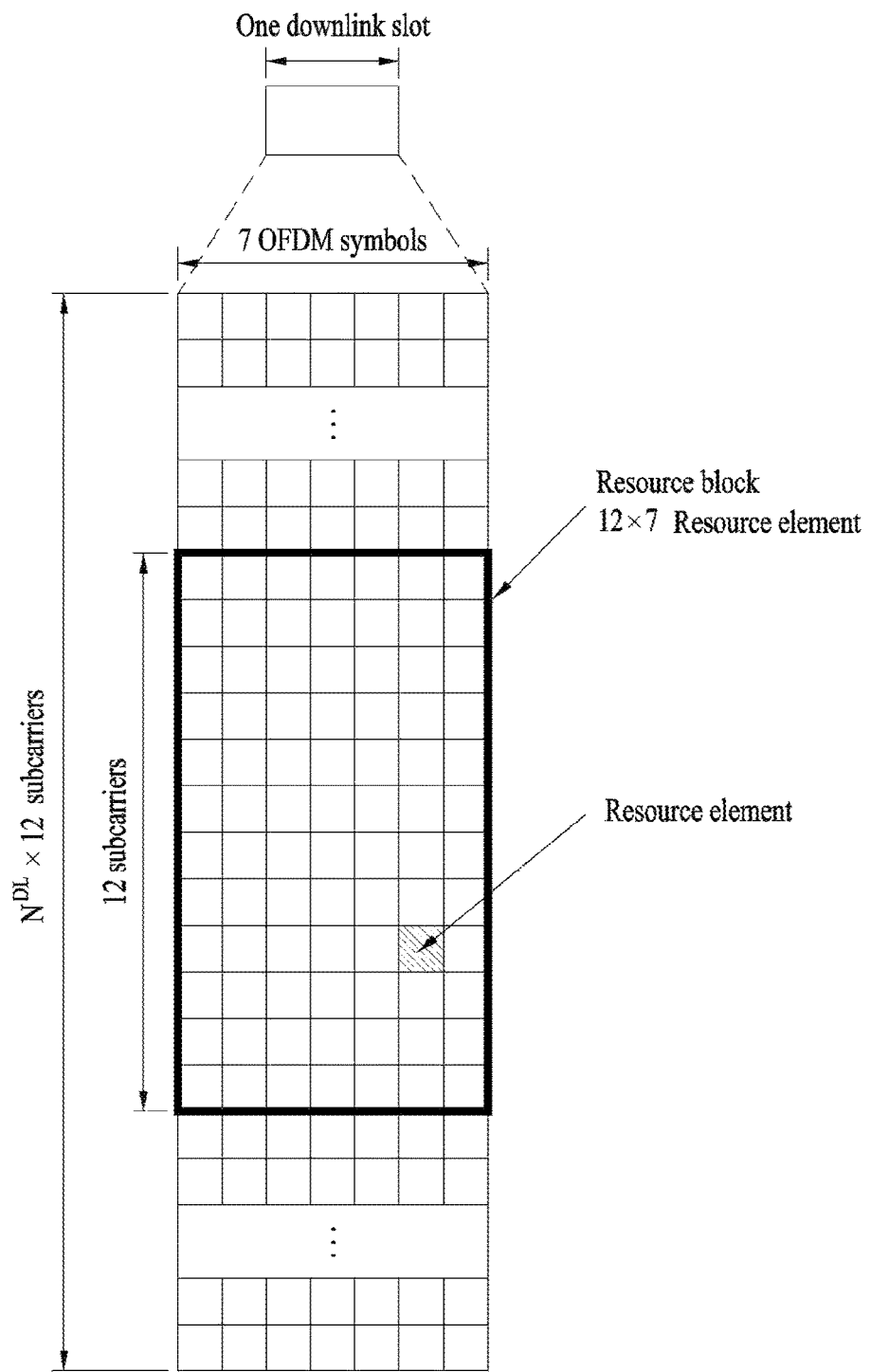
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
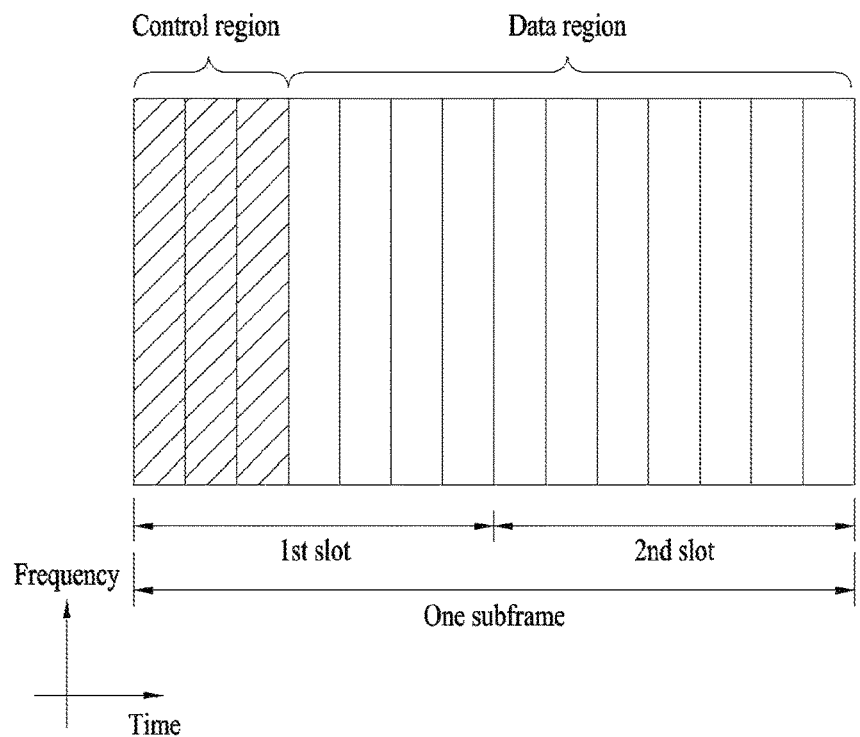
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
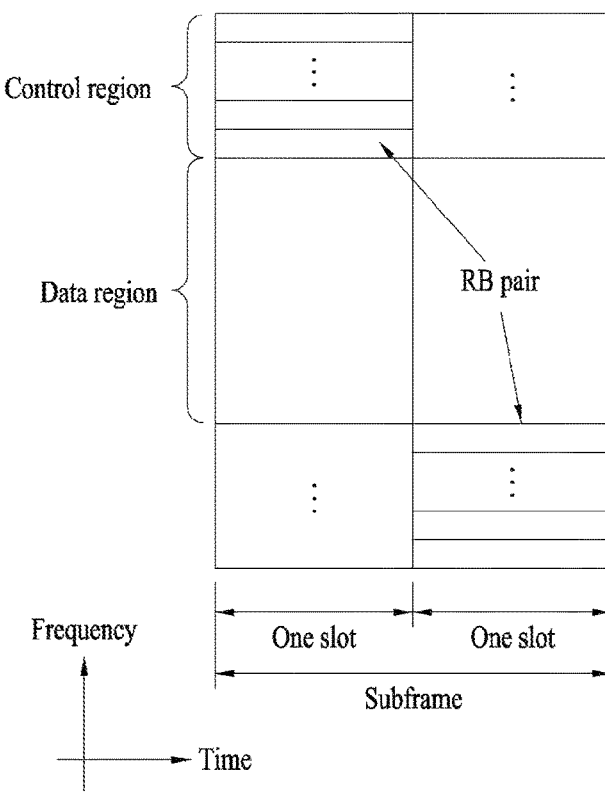
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
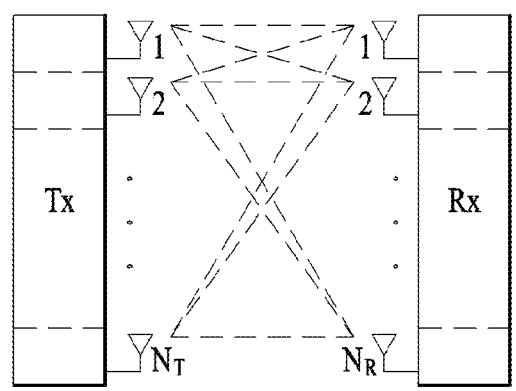
FIG. 5 is a diagram for a configuration of a wireless communication system having multiple antennas.
Figure 5:
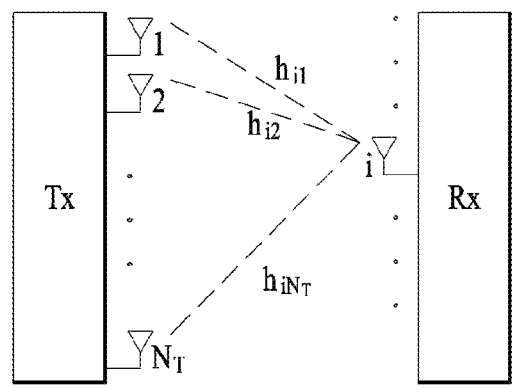

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, Ŝ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector Ŝ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NRxNT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
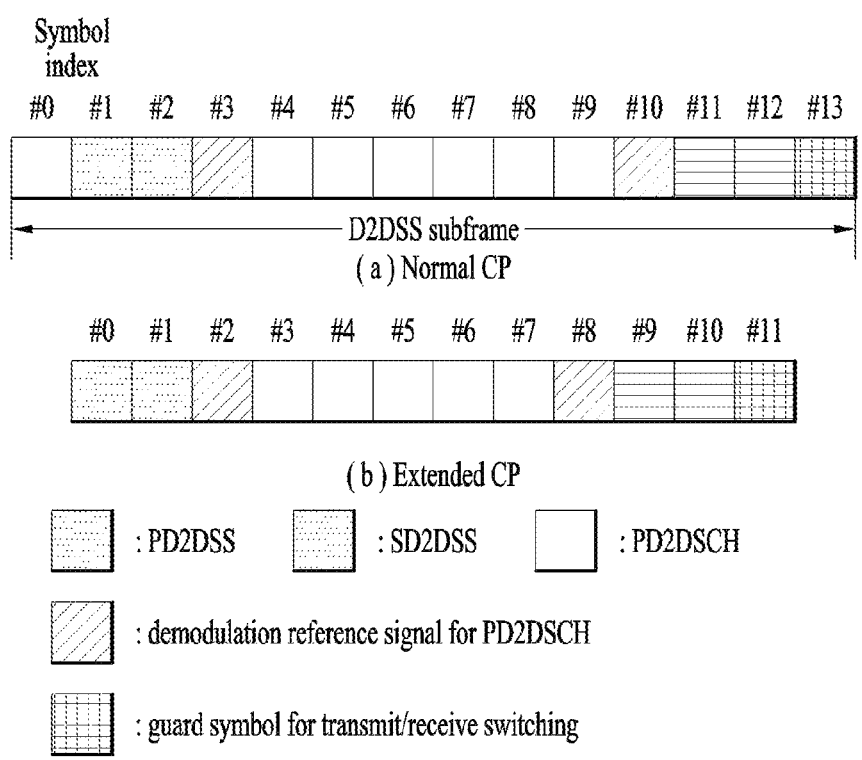
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
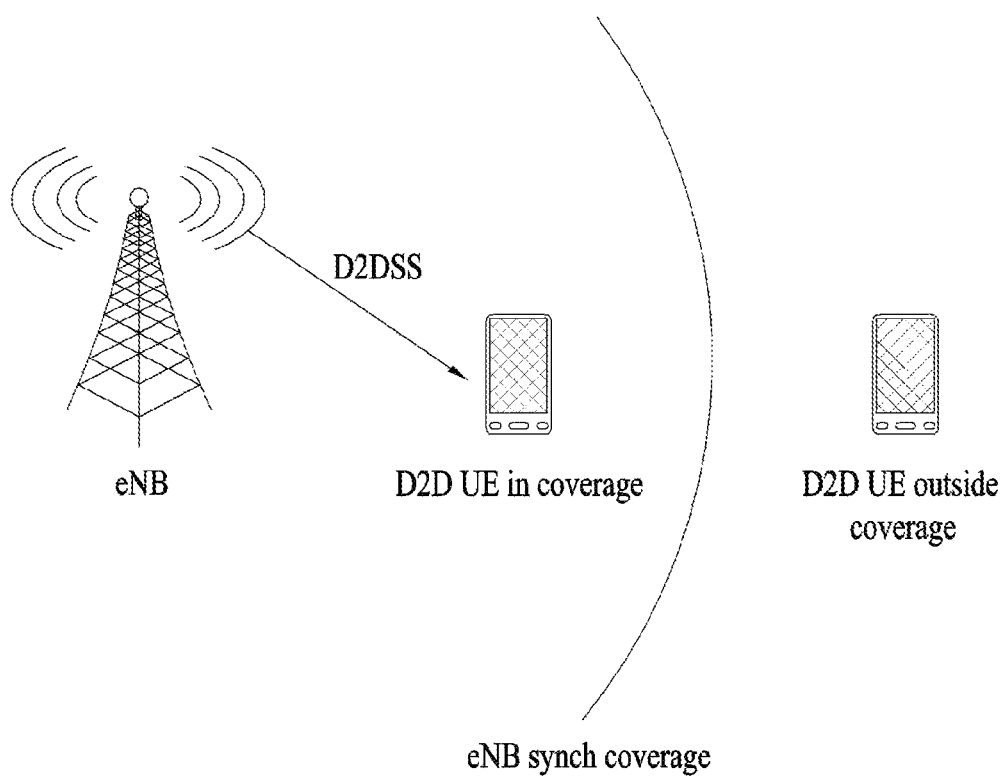
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
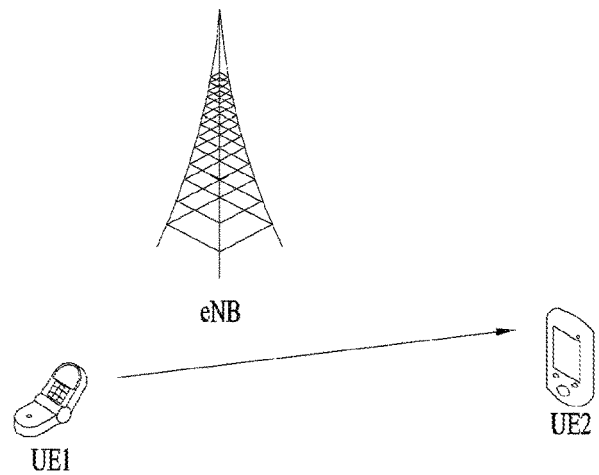
FIG. 8 is a diagram for an example of a D2D resource pool for performing D2D communication.
Figure 8:
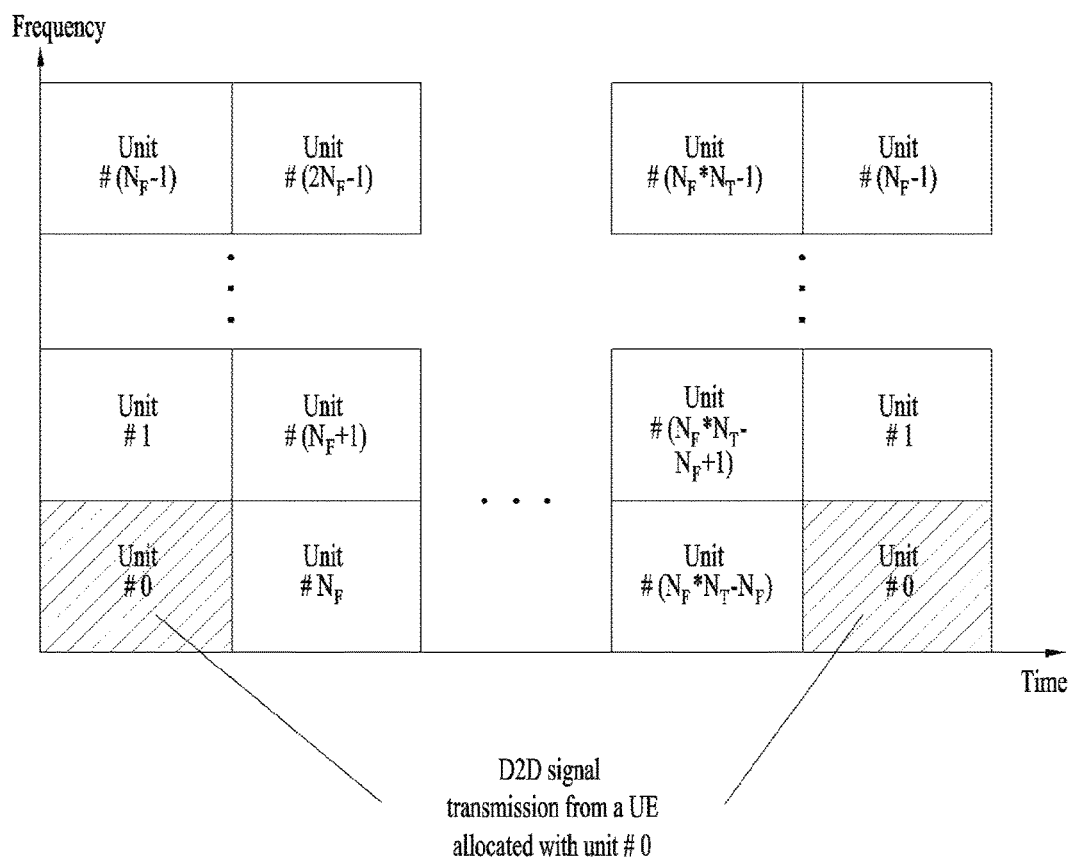

FIG. 8 shows an example of a UE1, a UE2 and a resource pool used by the UE 1 and the UE 2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE 1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
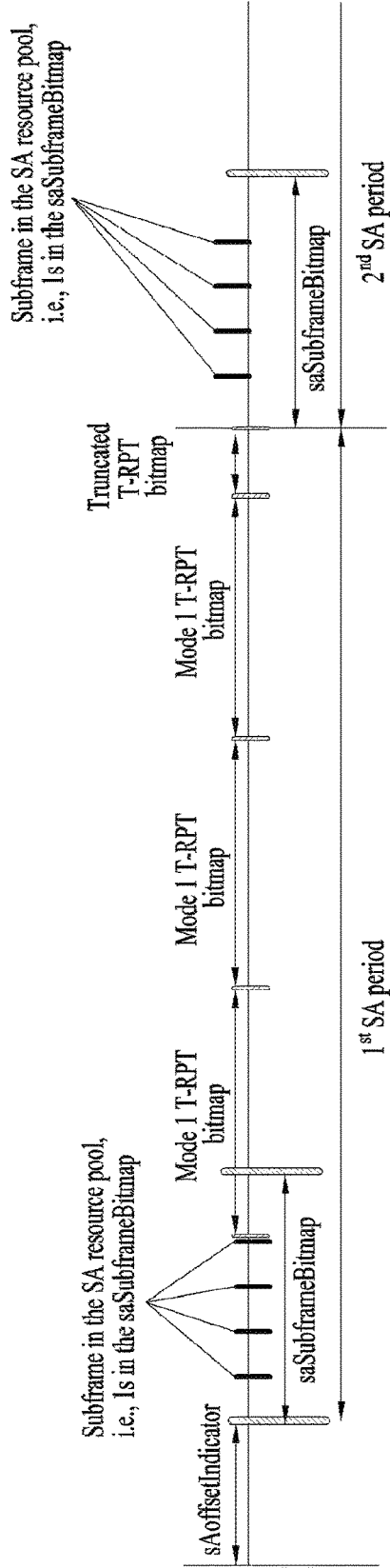
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

Method of Generating and Transmitting SC-FDM (Single Carrier Frequency Domain Multiplexing) Signal In the following, a method of generating and transmitting a D2D signal according to one embodiment of the present invention is explained based on the aforementioned discussion. The method proposed in the present invention can be extensively applied to a case that a signal is transmitted to a base station of a terminal or a different node and a case that an eNB, a relay node, a small-size base station transmits a signal as well as a D2D case.

According to the embodiment of the present invention, a signal is generated in a manner that each of one or more modulation symbol groups, which are generated from one or more transport blocks, is mapped to one or more RB groups and a different beam vector is applied to each of one or more RB groups.

Figure 10:
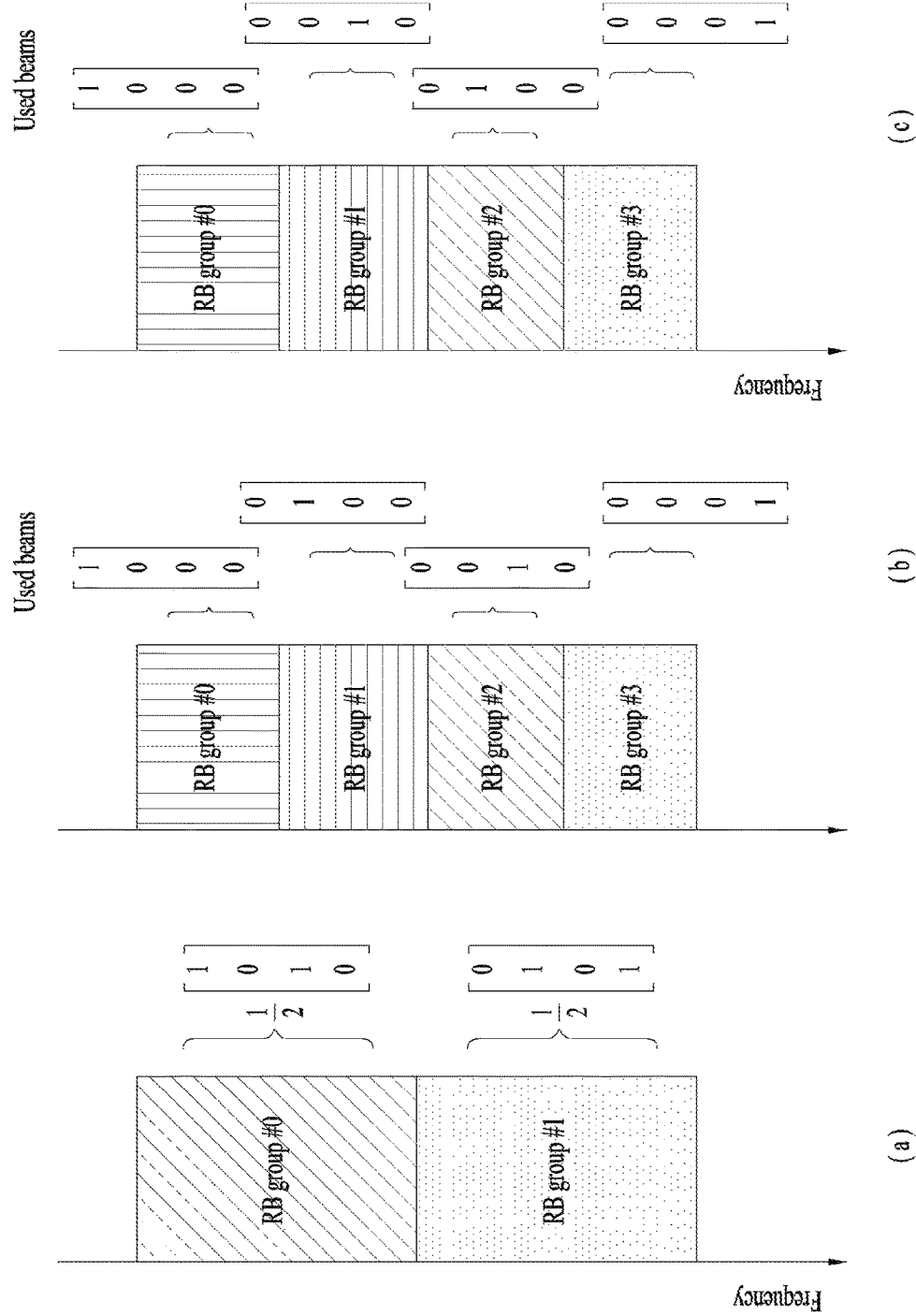
FIGS. 10 to 15 are diagrams for explaining embodiments of the present invention.
Figure 11:
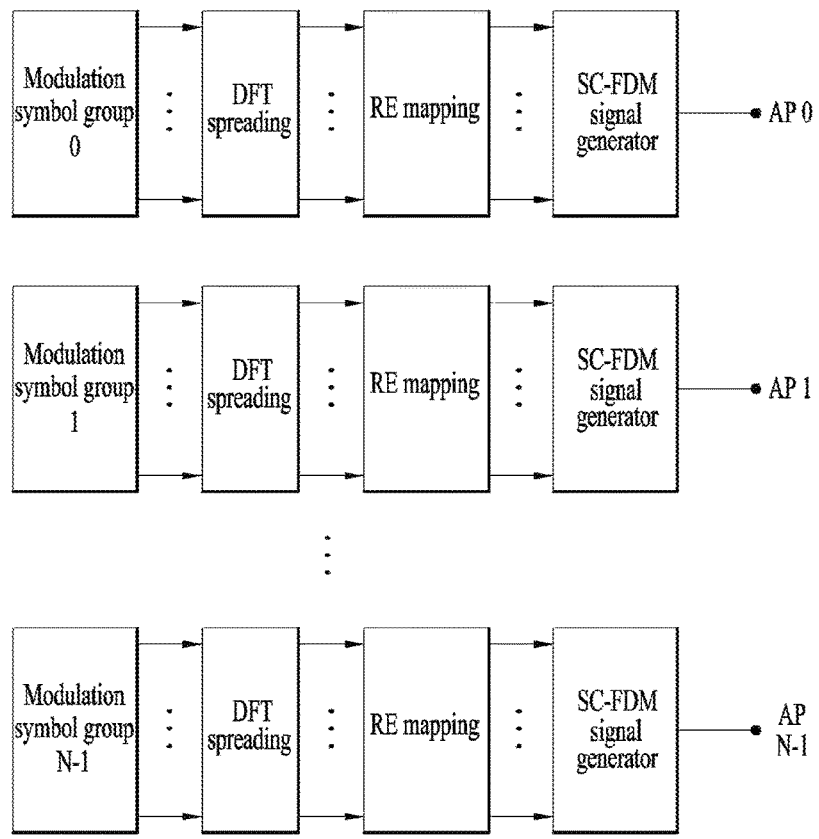
Figure 11:
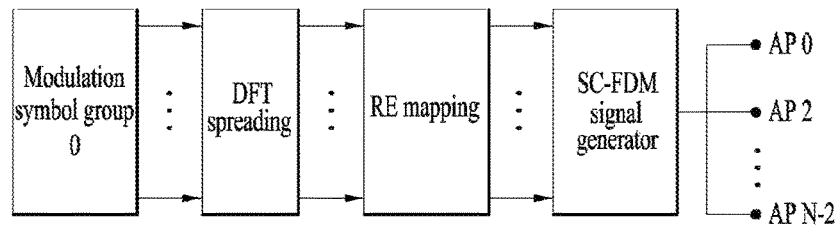
Figure 11:
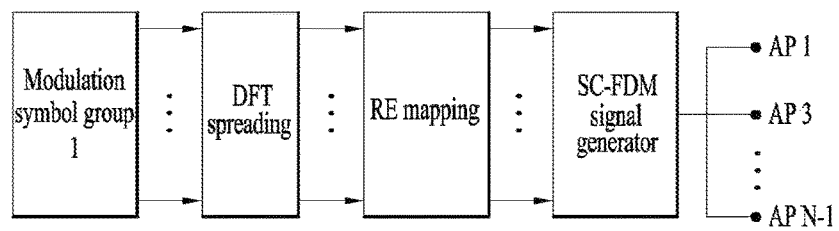

In this case, the number of beam vectors may vary. As a specific method, the number of beam vectors can be determined according to a channel state. The number of beam vectors may increase as a channel property is getting close to a flat. In particular, as a channel has a selective property, the number of beam vectors may be small. For example, referring to FIG. 10 (a), if a channel state is selective, as shown in FIG. 10 (a), two beam vectors are used. If a channel state is flat, as shown in FIGS. 10 (b) and (c), four beam vectors can be used. In particular, if the number of beam vectors is determined according to a channel state, it may be able to maximize diversity gain. FIG. 10 (a) shows a case of 2 Tx antennas and FIGS. 10 (b) to (c) show a case of 4 Tx antennas. FIG. 10 (b) shows a case that antennas are sequentially used in each RB group and FIG. 10 (c) shows a case that antennas are used in an order of 0, 2, 3, and 1 in consideration of correlation between antennas to maximize diversity.

In the foregoing description, each of one or more RB groups consists of contiguous RBs on a frequency axis. In particular, each of one or more RB groups consists of contiguous RBs used for generating an LFDMA (localized SC-FDMA) signal described in the following. Or, each of one or more RB groups may correspond to a set of resources having a different comb index (comb type). In this case, the comb index may correspond to an offset used for mapping each modulation symbol included in one or more modulation symbol groups to a frequency axis resource in the entire frequency band. In particular, the comb index may include discontinuous frequency resources used for generating an IFDMA (interleaved SC-FDMA) signal described in the following.

In particular, the embodiment of the present invention can be comprehended as a beam vector is differently used according to continuous RB groups (or a different comb index/comb type) in frequency domain. For example, if there are 2 antennas, an RB group can be divided into two. If there are 4 antennas, an RB group can be divided into 4 or less. When a beam vector is used according to an RB group, since a beam is used for selecting an antenna, a beam vector can include an element which is 0. The number of beam vectors can be transmitted via SA (scheduling assignment). It may be able to signal the number of beams of a following data packet and/or a beam index in the SA (scheduling assignment). The number of beams and a type of a beam can be determined in advance. Or, a transmitter can forward a signal to a receiver via physical layer signaling or higher layer signaling to indicate the number of beams and a type of a beam. Beam vectors different from each other can be indicated by a beam set index. In this case, a beam set can be determined in advance and can include a plurality of beam vectors orthogonal to each other. For example, when the number of beam vectors/the number of RB groups/the number of antennas is equal to or less than 2, such a beam set as $$\left\{ \frac{1}{\sqrt{2}} \begin{bmatrix} 1 \\ 0 \end{bmatrix}, \frac{1}{\sqrt{2}} \begin{bmatrix} 0 \\ 1 \end{bmatrix} \right\}$$

can be used. When the number of beam vectors/the number of RB groups/the number of antennas is equal to or less than 4, such a beam set as, $$\left\{ \frac{1}{2}\begin{bmatrix}1\\1\\1\\0\end{bmatrix}, \frac{1}{2}\begin{bmatrix}1\\1\\-1\\0\end{bmatrix}, \frac{1}{2}\begin{bmatrix}1\\1\\j\\0\end{bmatrix}, \frac{1}{2}\begin{bmatrix}1\\1\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix} \right\}$$

can be used. In each of the beam sets, indexes may corresponds to 0, 1, 2, . . . .

In the foregoing description, a modulation symbol group can be generated by grouping modulation symbols, which are generated by performing channel coding on one transport group. Or, the modulation symbol group can be generated by repeatedly performing channel coding on one transport block. Or, the modulation symbol group can be generated by performing channel coding on each redundancy version of one transport block. Or, the modulation symbol group can be generated by performing channel coding on each of two or more transport blocks.

In the following, various embodiments for generating an LFDMA signal and an IFDMA signal are explained on the basis of the aforementioned characteristic that a different beam vector is applied to each of RB groups.

Method of Generating LFDMA Signal

Method 1—Separated LFDMA Signal Generation Per Antenna

Figure 12:
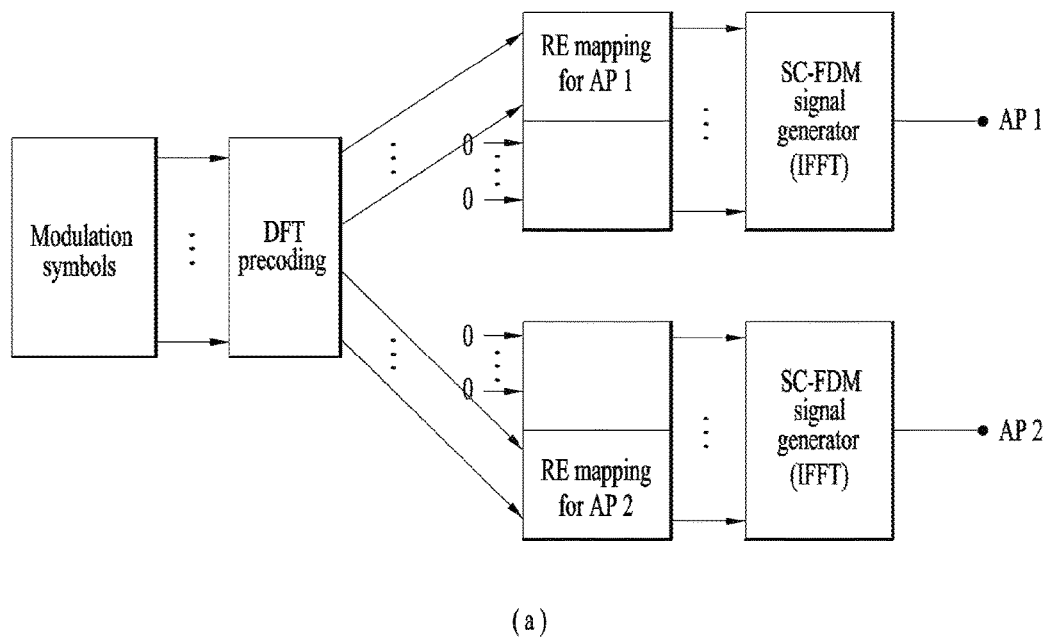
Figure 12:
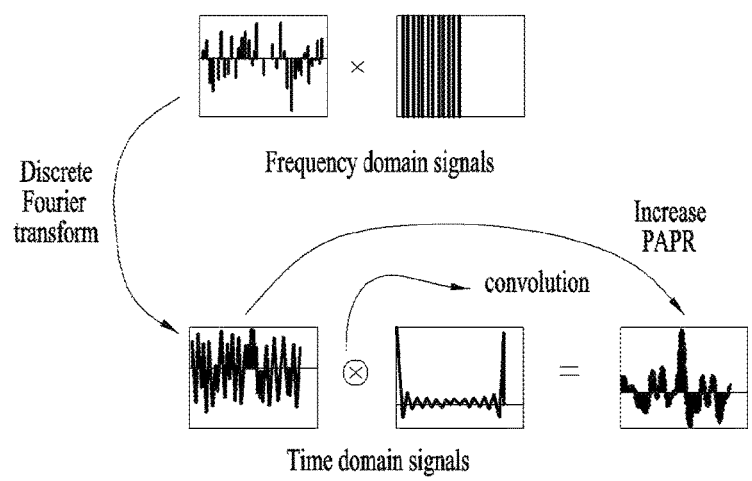

The method 1 corresponds to a method of generating an SC-FDMA signal by applying separate precoding according to an antenna port. According the method 1, a signal is generated by performing separate DFT spreading according to a modulation symbol group. More specifically, an SC-FDMA signal, which is transmitted from each antenna, is continuously mapped without changing a phase or a size in frequency domain after DFT spreading or is mapped using an interleaved type (interleaved SC-FDMA) without changing a phase or a size in frequency domain. An LFDMA signal to which separate DFT spreading is applied can be transmitted via a different antenna (FIG. 10 (a) shows a scheme of transmitting a separate LFDMA signal in each antenna, whereas FIG. 10 (b) shows a scheme of transmitting a single LFDMA signal using a plurality of antennas). By doing so, it may be able to minimize PARR. If the DFT spreading is not applied according to each modulation symbol group, PARR increases and a problem may occur. For example, as shown in FIG. 12 (a), if mapping is performed after DFT spreading is performed on the entire modulation symbols, a signal transmitted via an antenna port 1 may have a form by which a square function is multiplied in frequency domain and the signal may have a form that a sinc function is convoluted with a whole SC-FDM signal in time domain. In this case, as shown in FIG. 10 (b), PARR may increase. The aforementioned phenomenon may also occur when a precoder is changed in frequency domain in an SC-FDM system. For example, when a precoder is changed in an RB unit or an RE unit in frequency domain, PARR may increase. Like SFBC (or STBC), if two SC-FDM signals are transmitted from a single antenna in a manner of being combined with each other, PARR can be deteriorated.

Subsequently, a modulation symbol group can be generated from one or more transport groups. Specifically, it may use methods described in the following.

Method 1-a

One transport block is passing through single channel coding and modulation symbol mapper to generate modulation symbols. The generated modulation symbols are divided into N (N is equal to or less than the number of APs) number of groups, a separate LFDMA signal is generated according to each group (IFFT is performed after separate DFT spreading is applied), and each LFDMA signal is transmitted using a separate antenna. In this case, a frequency resource used by an LFDMA signal can be determined according to the number of antennas of a transmitter. As a resource allocation method, it may be able to use a resource allocation scheme independent of an LFDMA signal and a resource allocation scheme dependent of a specific LFDMA signal.

In case of the resource allocation scheme independent of an LFDMA signal, it may apply a separate resource to a frequency resource used by each LFDMA signal (i.e., a frequency resource used in an RE mapping step after DFT spreading is performed) according to an LFDMA signal. For example, when a specific UE transmits an LFDMA signal to a plurality of UEs, a transmission UE separately configures a frequency resource according to an LFDMA signal and informs a reception UE of the frequency resource via physical layer (e.g., scheduling assignment) signal or a higher layer signal. If an eNB indicates the specific UE to transmit a plurality of LFDMA signals using a separate antenna, it may use methods described in the following. When RA of a plurality of LFDMA signals is indicated via single DCI (downlink control information), it may be able to define a separate DCI format without using legacy DCI. For example, it may be able to newly define DCI including RA of a plurality of LFDMA signals among internal fields of corresponding DCI by differently configuring a CRS mask (define RNTI of new DCI) while the DCI has a length identical to a length of a DCI format 4 or 0. If an eNB indicates a specific UE to transmit a plurality of LFDMA signals using a separate antenna, RS fields as many as the number of LFDMA signals can be separately signaled via DCI. Or, similar to multi-cluster transmission, a start point and an end point of each RB group can be indicated to indicate each LFDMA frequency resource. In case of the multi-cluster transmission scheme, it may be able to use a method defined in legacy LTE. Meanwhile, in case of separately indicating frequency resource allocation of a plurality of (three or more) LFDMA signals, it may be able to define a new DCI format.

In case of a resource allocation scheme dependent of a specific LFDMA signal, a frequency resource used by each LFDMA signal is determined depending on a frequency resource used by a specific LFDMA signal. If a size of an RB group of each LFDMA signal is the same, it may be able to indicate resource allocation by signaling a start RB and an end RB of a specific LFDMA signal, and a (time and/or) frequency offset. In this case, a value of the offset may correspond to 0. A receiver receiving an LFDMA signal may inform a transmitter of the offset value via a physical layer signal or a higher layer signal. If the offset value corresponds to 0, it may indicate that a plurality of LFDMA signals are transmitted using the same time frequency resource. In this case, the receiver should have a plurality of antennas. In this case, the number of antennas of the receiver should be equal to or greater than the number of overlapped LFDMA signals. In particular, the number of overlapped signals depends on the number of antennas of the receiver. If the receiver has a single antenna, an offset size should be greater than an RB group size. This means that a different LFDMA signal uses a different frequency resource. If LFDMA signals different from each other use the same overlapped frequency resource, a DMRS can be used for identifying a base sequence ID, CS (cyclic shift), and/or OCC (orthogonal cover code). For example, an LFDMA signal 1 may use CS 0 and an LFDMA signal 2, which is transmitted in a manner of being overlapped with the same frequency resource, may use CS 6. This method can also be applied to the resource allocation scheme independent of an LFDMA signal.

As a specific example, when the number of RBs allocated to a transport block to be transmitted by a specific UE corresponds to 4 and there are 2 APs, 2 RBs are generated as a separate SC-FDM signal by passing through 24-point DFT spreading and the separate SC-FDM signal is transmitted to an AP 0. The remaining 2 RBs are generated as a separate SC-FDM signal by passing through 24-point DFT spreading and the separate SC-FDM signal is transmitted to an AP 1.

Figure 13:
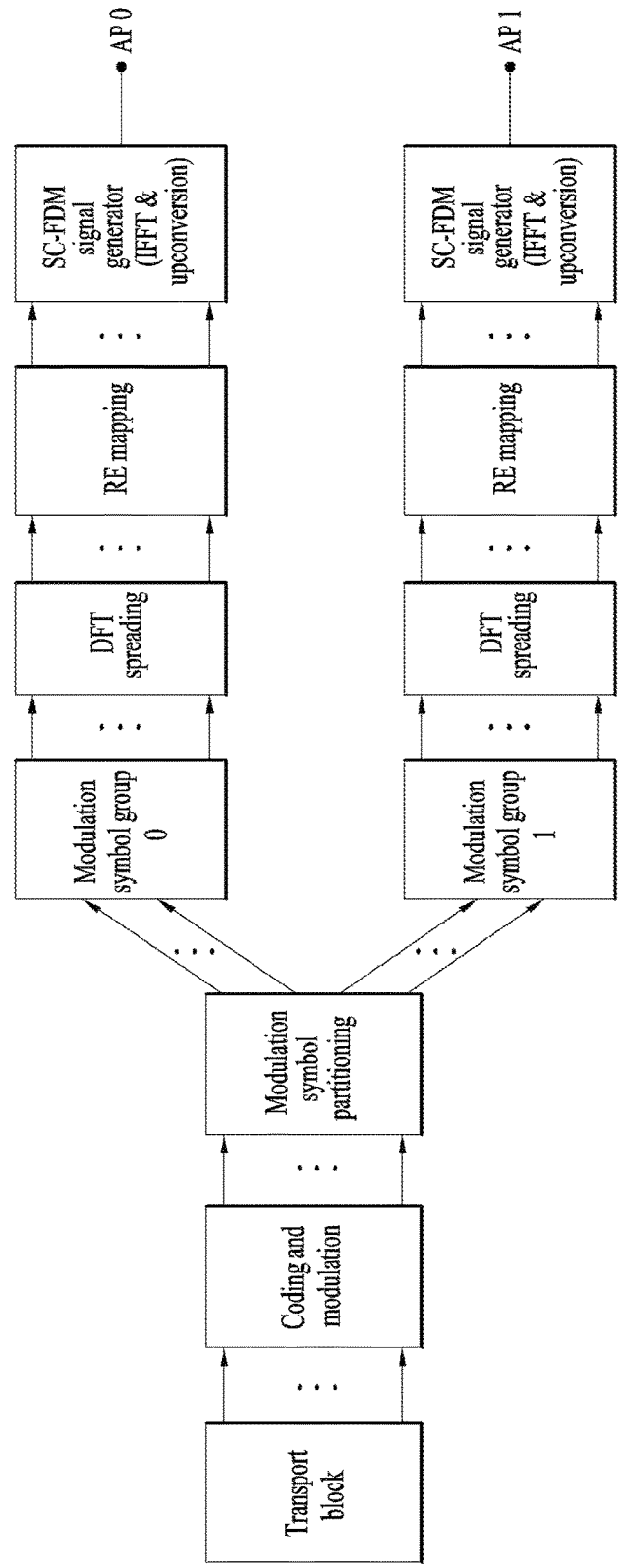

FIG. 13 shows a case that modulation symbols of one transport block are divided into two groups to generate separate SC-FDM signals. Each of the SC-FDM signals is transmitted to each AP. If the number of transmission antennas exceeds 2, one LFDMA signal can be transmitted via a plurality of antennas. In this case, the signal can be transmitted by multiplying a size and/or phase change value according to an antenna.

Method 1-b

A plurality of modulation symbol groups can be generated from one transport block using separate channel coding and modulation. In this case, the separate channel coding can be performed in a manner that a modulation symbol for one transport block is repeated. Or, the separate channel coding can be performed to generate a signal having a different redundancy version (RV) for one transport block. In this case, a coding rate for each LFDMA signal may or may not be the same. If the coding rate is different, a receiver may indicates the coding rate, MCS, or CQI value via physical layer signaling or higher layer signaling. As a different method, MCS per LFDMA signal can be determined by an offset which is determined for MCS of a specific LFDMA signal in advance. An eNB can indicate the offset value via physical layer signaling or higher layer signaling. In case of performing D2D, a transmission UE or a reception UE may inform the reception UE or the transmission UE of the offset value via a physical layer signal or higher layer signaling. In case of performing D2D, a transmission UE (or reception UE) can signal the offset value to the reception UE (or transmission UE) via a physical layer signal (e.g., SA). Among the aforementioned methods, the method of differently configuring RV according to an LFDMA signal can be comprehended as being identical to a method of applying TTI bundling on PUSCH in frequency domain. In this case, if an LFDMA signal is received by a different device, a CRC can be included in each LFDMA signal. Yet, if the LFDMA signals are received by a single device, a CRC can be added one time only among the LFDMA signals.

When a modulation symbol group is generated by repeating the same modulation symbol, DFT spreading can be performed one time only. In this case, a sequence on which the DFT spreading is performed is replicated to make a plurality of symbols and the symbols are transmitted using a different antenna. In this case, a frequency resource used by an LFDMA signal transmitted by each antenna may or may not be the same. In this case, each of the DFT spread symbols may become separate resource allocation. Unlike the method 1-a, since an LFDMA symbol transmitted to a specific AP corresponds to the same modulation symbol, it may be able to transmit LFDMA signals for each modulation symbol group in the same frequency RB region irrespective of the number of reception antennas of a reception UE. In this case, it may be able to transmit the signals by applying a size and/or a phase change to each LFDMA signal. In other word, a resource allocation method of each LFDMA signal can be independently performed according to each LFDMA signal and can be determined depending on a specific LFDMA signal. Regarding this, it may refer to the explanation on the method 1-a for a specific method.

The aforementioned method may correspond to a scheme similar to SORTD (spatial orthogonal resource transmit diversity). More specifically, two resources are allocated to a UE and the same information is transmitted from a different resource using a different AP. In this case, each LFDMA signal may have a separate MCS level. This method can be applied to the method 1a as well. In particular, one transport block is divided into a plurality of modulation symbol groups by passing through MCS and each of the divided signals is generated as an LFDMA signal and transmitted. Discovery transmission is explained as an example. Assume that one discovery message includes 2 PRB pairs. In this case, first PRB pair is transmitted via an antenna port a and second PRB pair is transmitted via an antenna port b. In this case, since each PRB pair experiences a different channel, a diversity order increases. In this case, since a separate LFDMA signal is transmitted according to an antenna port, separate DFT spreading is applied according to each antenna port and IFFT is obtained to generate LFDMA signal. The present method can be extensively applied to 2 ports. By doing so, it may be able to generate and transmit separate LFDMA signals as many as the maximum transmission antennas.

Method 1-c

Figure 14:
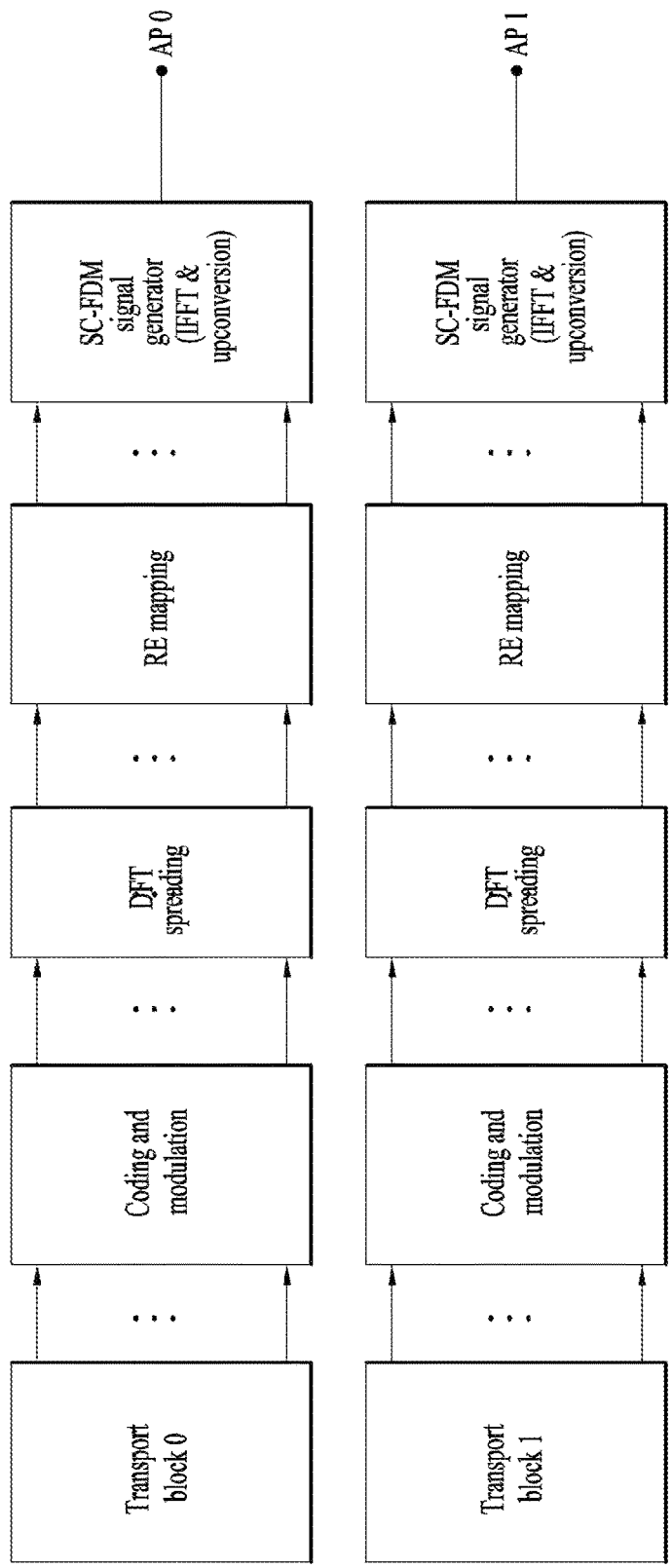

A plurality of modulation symbol groups can be generated from a plurality of transport blocks. If a specific UE has a plurality of transport blocks to be transmitted, coded bits of each transport block is generated as an LFDMA signal by passing through separate DFT spreading and a generated LFDMA symbol can be transmitted to a separate AP. This method can be used for a case that a UE transmits separate information to a plurality of receivers. For example, when a specific D2D UE operates as a relay and each relay D2D UE transmits a signal to a plurality of UEs at the same time, it may be able to generate a separate LFDMA signal according to an AP and transmit a different signal to each AP. In this case, a frequency resource used by an SC-FDM signal according to an AP can be independently allocated and resource allocation can be performed depending on a frequency resource of a specific AP. FIG. 14 shows a case that two transport blocks are generated as a separate SC-FDM signal and the SC-FDM signal is transmitted.

In the foregoing description, an RB group transmitted to the same AP should be continuous in frequency domain (to prevent PARR from being increased and generate LFDMA signal) and a DMRS per RB group should be transmitted from an AP identical to an AP to which an LFDMA signal of an RB group is transmitted. In other word, a beamforming vector assigned to an RB group should be also assigned to a DMRS of the RB group. And, a DMRS should not be interpolated between RB groups different from each other. In this case, in order to make a receiver (an eNB or a UE) know a size of an RB group (in order to make interpolation not to be performed between RB groups), a transmitter may signal the size of the RB group to a receiver via physical layer signaling or higher layer signaling (based on an indication of the transmitter) in frequency domain or the receiver may signal the size of the RB group to the transmitter via physical layer signaling or higher layer signaling (based on a request of the receiver).

Method of Generating IFDMA Signal

As mentioned in the foregoing description, each of RB groups to which a modulation symbol group is mapped may correspond to a set of resources having a different comb index (comb type) (In this case, the comb index corresponds to a frequency RE offset in IFDMA). In particular, an SC-FDM signal transmitted from each antenna can perform resource allocation using the comb index similar to the interleaved SC-FDMA. In particular, an SC-FDMA signal having a different comb type can be transmitted via a different AP. Signals of a different comb index are transmitted in a single AP without being summed up. A method of generating a modulation symbol block may refer to the aforementioned explanation on the method of generating the LFDMA signal.

Figure 15:
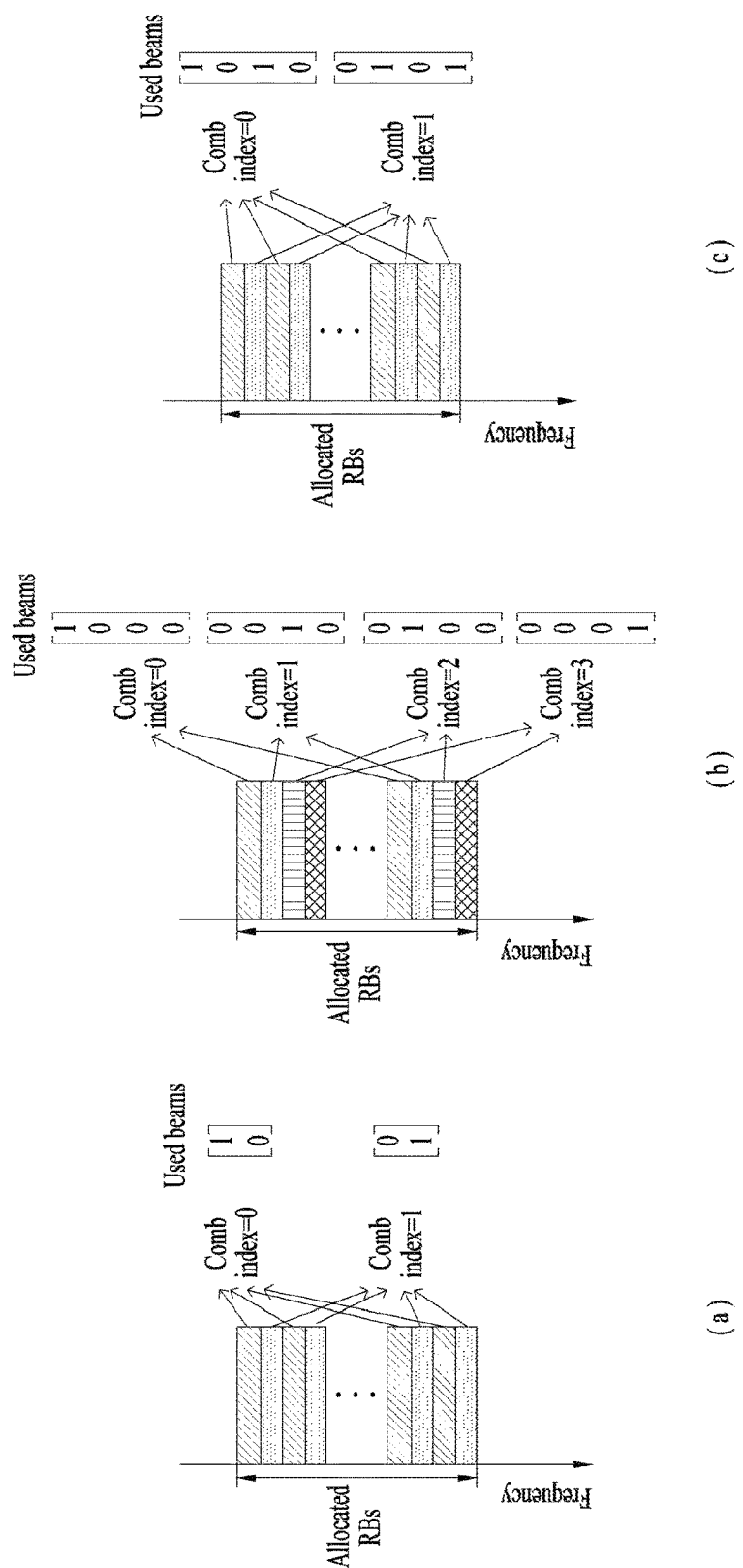

FIG. 15 shows a method of generating a signal using IFDMA scheme and diversity transmission schemes for performing transmission by applying a different beam vector to each RB group. FIG. 15 (a) shows a case that there are 2 modulation symbol groups/RB groups/comb indexes and there are 2 antenna ports, FIG. 15 (b) shows a case that there are 4 modulation symbol groups/RB groups/comb indexes and there are 4 antenna ports, and FIG. 15 (c) shows a case that there are 2 modulation symbol groups/RB groups/comb indexes and there are 4 antenna ports.

Besides, similar to a legacy PUSCH transmission scheme, it may use a method that one transport block generates one LDFMA signal and different precoding is applied according to an RB group. In this case, since PARR increases, the present inventions proposes a method of selectively applying independent precoding according to an RB group only when a level is equal to or lower than a specific modulation level. For example, precoder change (cycling) per RB group is applied only when a level is equal to or lower than QPSK modulation level (BPSK, QPSK) and the precoder change is not applied when the level is equal to higher than 16QAM. A beam used in the present method has no restriction. A beam can be alternatively used according to an RB group among a predetermined set of orthogonal beams. In order to minimize the increase of PARR, it may be able to determine a rule of using the same beam according to "continuous RB group". In this case, a size of a used beam set and a beam index can be determined in advance. Or, a transmitter (receiver) can signal the size and the index to the receiver (transmitter) via physical layer signaling or higher layer signaling. As a method of signaling the size of the beam set and the beam index at the same time, if a set of orthogonal beams is determined in advance, an index is assigned to each beam set, and the index of the beam set is signaled, an allocated RB is uniformly divided by the size (number of beams included in the beam set) of the beam set and a beam can be sequentially used according to each RB group.

The methods proposed by the present invention can be applied to any system using SC-FDM modulation. For example, the proposed methods are applicable to a case that a D2D-related signal is transmitted using SC-FDM scheme. The aforementioned methods can be differently applied according to a type of a transmitted channel. For example, a diversity scheme to be applied when PUSCH is transmitted and a diversity scheme to be applied when a D2D signal (e.g., a discovery signal) is transmitted are different from each other.

Configurations of Devices for Embodiments of the Present Invention

Figure 16:
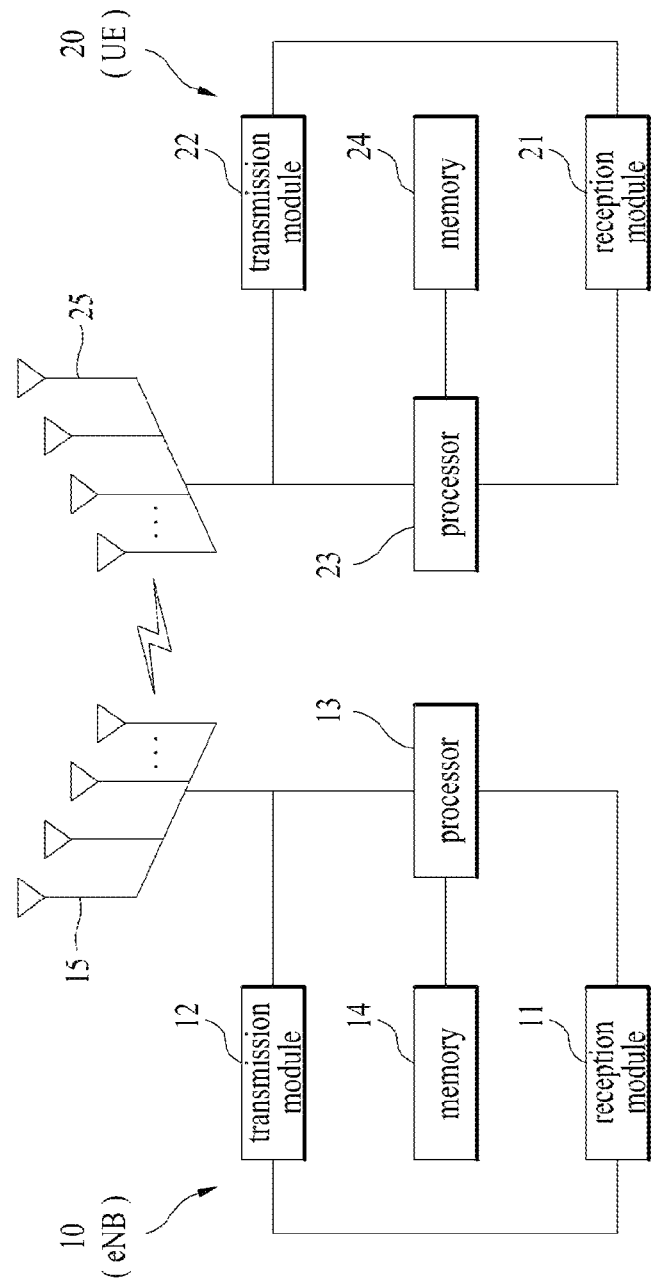
FIG. 16 is a diagram for configurations of a transmitter and a receiver.

FIG. 16 is a diagram illustrating configuration of a transmit point apparatus and a UE according to one embodiment of the present invention.

Referring to FIG. 16, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 16, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 16 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:
1. A method of generating a D2D (device-to-device) signal, which is generated by a user equipment in a wireless communication system, the method comprising:
grouping a plurality of modulation symbols, generated by applying channel coding to one transmission block, into one or more modulation symbol groups,
mapping each of the one or more modulation symbol groups to one or more resource block (RB) groups;
applying beam vectors to the one or more RB groups; and
transmitting a signal in the one or more RB group to which the beam vector is applied,
wherein each of the one or more RB groups has one modulation symbol group applied with a different beam vector, and
wherein the number of beam vectors is determined according to a channel state;
wherein each of the one or more RB groups corresponds to a set of resources having a different comb index, and
wherein a comb index corresponds to an offset used for mapping each modulation symbol contained in the one or more modulation symbol groups to a frequency axis resource on a whole frequency band.

2. The method of claim 1, wherein the number of beam vectors increases as a channel property approaches a flat.

3. The method of claim 1, wherein each of the one or more RB groups consists of RBs contiguous on a frequency axis.

4. The method of claim 1, wherein the one or more modulation symbol groups is generated by grouping modulation symbols which are generated by performing channel coding on one transport block.

5. The method of claim 1, wherein the one or more modulation symbol groups is generated by repeatedly performing channel coding on one transport block.

6. The method of claim 1, wherein the one or more modulation symbol groups is generated by performing channel coding on each redundant version of one transport block.

7. The method of claim 1, wherein a number of beam vectors is transmitted via a scheduling assignment (SA).

8. The method of claim 1, wherein the beam vector is indicated by a beam set index.

9. The method of claim 8, wherein the beam set is determined in advance.

10. The method of claim 8, wherein the beam set comprises a plurality of beam vectors orthogonal to each other.

11. A device-to-device (D2D) user equipment (UE) performing D2D communication in a wireless communication system, the UE comprising:
a transmitter and a receiver; and a processor, operatively coupled to the transmitter and the receiver,
wherein the processor is configured to group a plurality of modulation symbols, generated by applying channel coding to one transmission block, into one or more modulation symbol groups,
map each of the one or more modulation symbol groups to one or more resource block (RB) groups, the apply beam vectors to the one or more RB groups, and
control the transmitter to transmit a signal in the one or more RB group to which the beam vector is applied,
wherein each of the one or more RB groups has one modulation symbol group applied with a different beam vector, and wherein the number of beam vectors is determined according to a channel state;
wherein each of the one or more RB groups corresponds to a set of resources having a different comb index, and
wherein a comb index corresponds to an offset used for mapping each modulation symbol contained in the one or more modulation symbol groups to a frequency axis resource on a whole frequency band.

* * * * *